United States Patent [19]
Watanabe et al.

[11] Patent Number: 5,694,275
[45] Date of Patent: Dec. 2, 1997

[54] MAGNETORESISTIVE MAGNETIC HEAD

[75] Inventors: Toshinori Watanabe; Toshihiro Kuriyama, both of Niigata-ken, Japan

[73] Assignee: Alps Electric Co., Ltd., Tokyo, Japan

[21] Appl. No.: 508,360

[22] Filed: Jul. 28, 1995

[30] Foreign Application Priority Data

Aug. 3, 1994 [JP] Japan .................... 6-201497

[51] Int. Cl.⁶ .................................................. G11B 5/39
[52] U.S. Cl. ............................................................. 360/113
[58] Field of Search .................................. 360/113, 126

[56] References Cited

U.S. PATENT DOCUMENTS

| | | | |
|---|---|---|---|
| 3,908,194 | 9/1975 | Romankiw | 360/113 |
| 4,663,685 | 5/1987 | Tsang | 360/113 |
| 5,018,037 | 5/1991 | Krounbi et al. | 360/113 |
| 5,483,402 | 1/1996 | Batra | 360/113 |
| 5,485,334 | 1/1996 | Nix et al. | 360/113 |
| 5,556,718 | 9/1996 | Motomura et al. | 360/113 X |

Primary Examiner—John H. Wolff
Attorney, Agent, or Firm—Guy W. Shoup; Patrick T. Bever

[57] ABSTRACT

In a magnetoresistive magnetic head having a laminate composed of a magnetoresistive (MR) layer showing the magnetoresistive effect, a SHUNT layer as a non-magnetic layer and a soft adjacent layer (SAL) for applying a transverse bias magnetic field to the MR layer, the MR layer and the SAL are made of the same $Ni_{81}Fe_{19}$ magnetic film. Since the SAL is magnetically saturated in the same direction as the direction of leakage flux of a recording medium (y direction), permeability thereof in the y direction decreases, and the MR effect function therein can be restricted. Although the MR layer and the SAL have the same specific resistance $\rho$, a sufficient detection current can be made to flow through the MR layer and a high-precision magnetic detection output can be obtained by making the MR layer thicker than the SAL.

5 Claims, 4 Drawing Sheets

MAGNETORESISTIVE MAGNETIC HEAD

BACKGROUND OF THE INVENTION

1. Field of the Invention

The present invention relates to a magnetic head comprising a laminate of thin films, and more particularly, to a magnetoresistive magnetic head having a trilayer structure composed of a magnetoresistive (MR) layer, a SHUNT layer and a soft adjacent layer (SAL).

2. Description of the Related Art

FIGS. 5 and 6 are enlarged front views respectively showing a hard bias magnetoresistive magnetic head and an exchange bias magnetoresistive magnetic head as viewed from the side opposed to a recording medium.

These magnetoresistive magnetic heads each have a trilayer structure composed of a MR layer 1 showing the magnetoresistance effect, a SHUNT layer 2 as a non-magnetic layer, and a SAL 3 for applying an SAL bias magnetic field (a transverse bias in the y direction) to the MR layer 1. The trilayer structure is provided between a lower insulating layer 4 and an upper insulating layer 5.

In order to apply a longitudinal bias magnetic field in the x direction to the MR layer 1 in the hard bias method shown in FIG. 5, hard bias layers 7 made of hard magnetic material are formed on both sides of the MR layer 1, and each sandwiched between a substrate layer 6 and a lead layer 8. The hard bias layers 7 are magnetized in the x direction, and applies a magnetically anisotropic magnetic field to the MR layer 1, by which the MR layer 1 is put into a single domain state.

In the exchange bias method shown in FIG. 6, an antiferromagnetic layer 9 is formed on the MR layer 1 in close contact, and a lead layer 10 is further formed thereon. Exchange anisotropic coupling of the antiferromagnetic layer 9 and the MR layer 1 magnetizes the MR layer 1 in the x direction to thereby induce a single domain state.

Stationary current in the x direction is applied from the lead layer 8 and the hard bias layer 7 to the MR layer 1 in FIG. 5, and stationary current in the x direction is applied to the MR layer 1 through the lead layer 10 and the antiferromagnetic layer 9 in FIG. 6. A transverse magnetic field is also applied to the MR layer 1 in the y direction by magnetostatic coupling energy generated by the SAL 3 when the current flows through the MR layer 1. When the MR layer 1 is put into a single domain state in the x direction and given the transverse bias magnetic field from the SAL 3, the resistance change with the change in the magnetic field of the MR layer 1 is set in a linear state.

Conventionally, it is preferable that the MR layer 1 be made of a material having a high magnetoresistive effect ratio (MR effect ratio) ($\Delta\rho/\rho$) and the SAL 3 be made of a material having a low MR effect ratio ($\Delta\rho/\rho$), wherein $\rho$ represents the specific resistance and $\Delta\rho$ represents the amount of change in the specific resistance relative to the magnetic field. Furthermore, it is preferable that the material of the MR layer 1 have a low specific resistance $\rho$ to allow the current to flow smoothly and the material of the SAL 3 have a high specific resistance $\rho$. Therefore, conventionally, the MR layer 1 is made of ferromagnetic material such as a Ni—Fe material, and the SAL 3 is made of soft magnetic material such as a Co amorphous material, a Ni—Fe—Nb material or a Ni—Fe—Zr material. The material of the SHUNT layer 2 is, for example, a Ta film.

Thus, the MR layer 1, the SHUNT layer 2 and the SAL 3 are conventionally made of different materials. Therefore, three kinds of targets respectively corresponding to the materials of the three layers are needed to form the layers by sputtering. Furthermore, three pairs of electrodes are needed in a sputtering apparatus to continuously form the layers in a stable thickness.

SUMMARY OF THE INVENTION

In view of the foregoing problems with the prior art, it is an object of the present invention to provide a magnetoresistive magnetic head in which three layers, MR, SHUNT and SAL, can be formed by the minimum number of kinds of materials and which can show an excellent magnetoresistive effect.

In order to achieve the above object, there is provided a magnetoresistive magnetic head having a trilayer structure composed of a MR layer showing the magnetoresistive effect, a SHUNT layer as a non-magnetic layer and a SAL for applying a bias magnetic field to the MR layer, wherein the MR layer and the SAL are made of the same magnetic material and the thickness of the MR layer is larger than that of the SAL.

The MR layer and the SAL may be both made of a Ni—Fe magnetic material.

It is preferable that the ratio of the MR layer to the SAL thickness be in a range of 0.4 to 0.7.

According to the present invention, the MR layer and the SAL out of the trilayer structure are made of the same magnetic material, for example, $Ni_{81}Fe_{19}$ (atm %). Therefore, the MR layer and the SAL have the same MR effect ratio ($\Delta\rho/\rho$). However, the magnetic permeability $\mu$ of the SAL relative to a leakage magnetic field of a recording medium can be decreased by saturating magnetization toward the leakage magnetic field in the SAL, which allows restraint on the MR effect in the SAL and fulfillment of an original function of the SAL.

Furthermore, since the MR layer and the SAL have the same specific resistance $\rho$, a stationary current (detection current) to be applied to the MR layer is liable to be diverted to the SAL. However, a sufficient current can be applied to the MR layer and a sufficient change in resistance relative to the leakage magnetic field of the recording medium can be obtained by choosing the thickness ratio between the MR layer and the SAL from a proper range. When the MR layer and the SAL are both made of a Ni—Fe magnetic material, a preferable thickness ratio of the MR layer to the SAL is in a range Of 0.4 to 0.7.

DESCRIPTION OF THE PREFERRED EMBODIMENT

An embodiment of the present invention will be described below.

Figure 1:
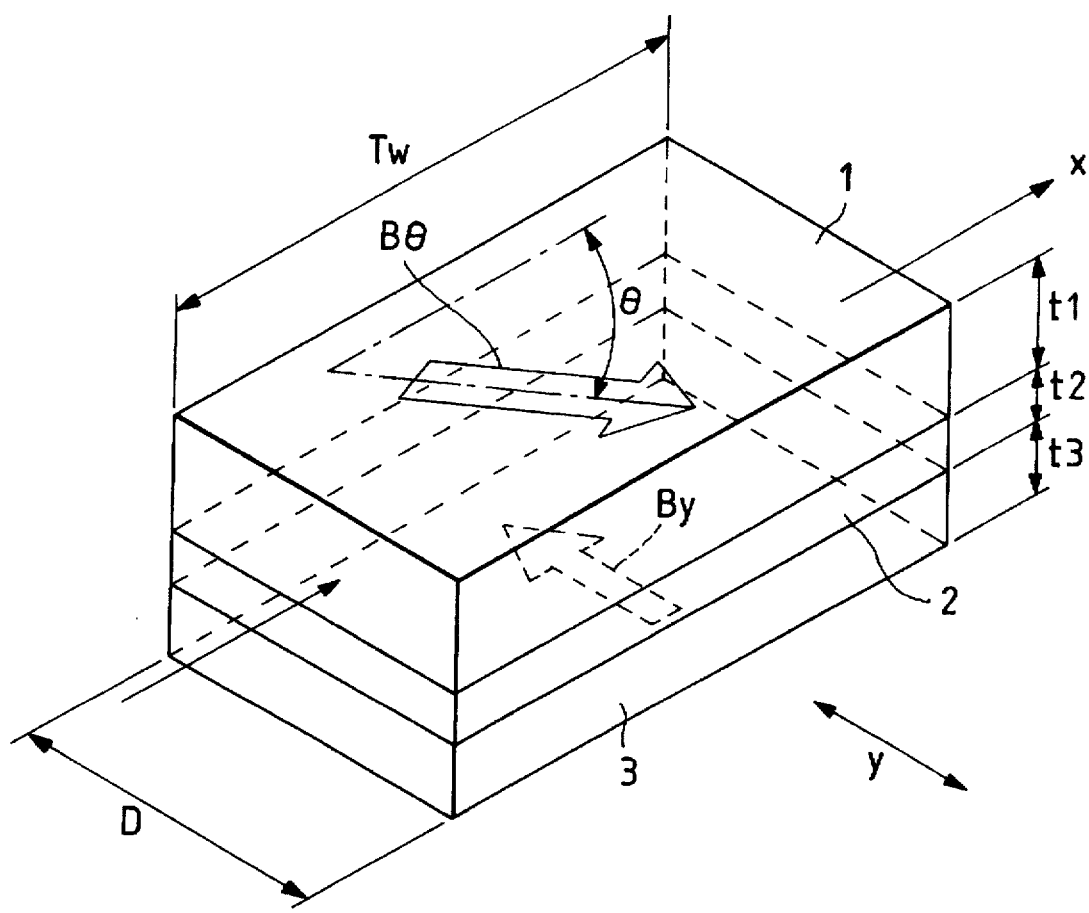
FIG. 1 is a perspective view of a trilayer device used in a magnetoresistive magnetic head according to the present invention.

A magnetoresistive magnetic head according to an embodiment of the present invention is provided with a trilayer device, shown in FIG. 1, composed of a MR layer 1 showing the magnetoresistive effect, a SHUNT layer 2 as a non-magnetic layer and a soft adjacent layer (SAL) for applying a SAL bias magnetic field (transverse magnetic field) to the MR layer 1. The thicknesses of the MR layer 1, the SHUNT layer 2 and the SAL 3 are respectively represented by t1, t2 and t3, and the depth of all the layers in the y direction is represented by D.

Figure 5:
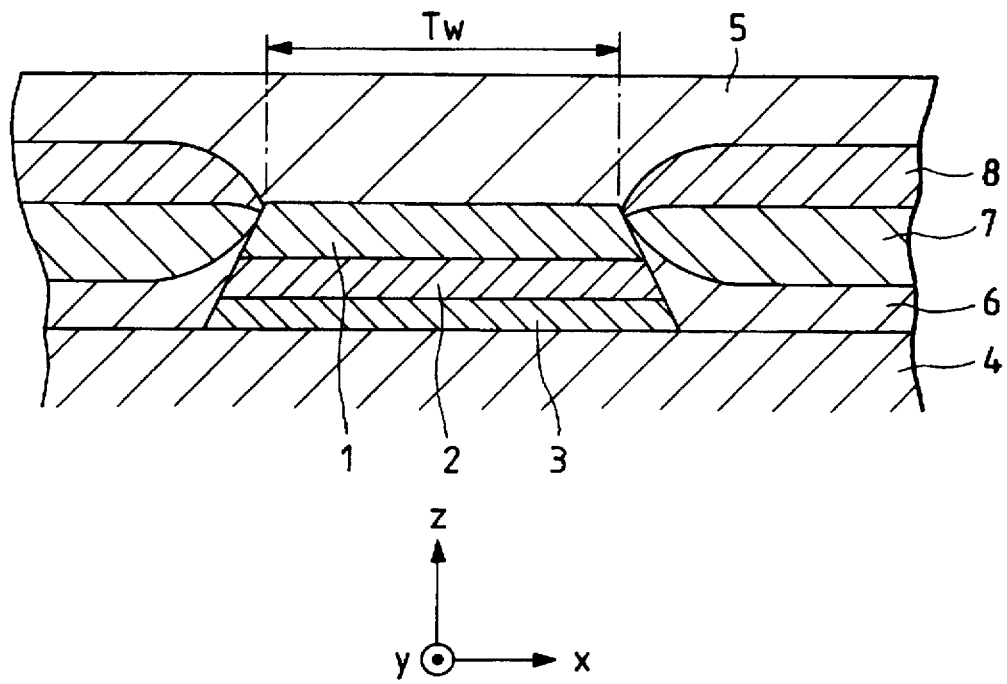
FIG. 5 is an enlarged front view of a hard bias magnetoresistive magnetic head.

The trilayer device shown in FIG. 1 is suitably used in the hard bias magnetoresistive magnetic head shown in FIG. 5. In the hard bias type, the trilayer device shown in FIG. 1 is formed on a lower insulating layer 4. Hard bias layers 7 of hard magnetic material are formed on both sides of the MR layer 1, and each sandwiched between a substrate layer 6 thereunder and a lead layer 8 thereon. Furthermore, an upper insulating layer 5 is formed on the MR layer 1 and the lead layer 8. The track width in this magnetic head is represented by Tw in agreement with the width of the MR layer 1.

In this embodiment, the MR layer 1 and the SAL 3 are formed of the same Ni—Fe magnetic material, more specifically, a $Ni_{81}Fe_{19}$ (atm %) magnetic film, and the SHUNT layer 2 is formed of a Ta film. Preferable thicknesses t1, t2 and t3 of the MR layer 1, the SHUNT layer 2 and the SAL 3 are respectively 300 Å, 150 Å and 165 Å. A preferable track width Tw is 3.5 µm.

The hard bias layers 7 are made of hard magnetic material such as a Co—Cr—Ta material, and the substrate layer 6 and the lead layer 8 are formed of a Cr film.

In this embodiment, the MR layer 1 and the SAL 3 are formed of the same $Ni_{81}Fe_{19}$ magnetic film. The $Ni_{81}Fe_{19}$ magnetic film has a MR effect ratio ($\Delta\rho/\rho$) of approximately 2% to 3%, and can show a sufficient magnetoresistive effect as the MR layer 1. Although it is conventionally thought that a material having a low MR effect ratio is suitable as the material of the SAL, the SAL in this embodiment is made of the same material as the MR layer 1, and also has the same MR effect ratio ($\Delta\rho/\rho$) as the MR layer 1.

However, the magnetic permeability µ of the SAL 3 in the y direction can be decreased by saturating magnetization of the SAL 3 in the y direction by magnetostatic coupling when current is applied to the MR layer 1. In other words, in the device shown in FIG. 1, the SAL 3 is magnetized in the y direction (By) by magnetostatic coupling when a stationary current (detection current) in the x direction is applied to the MR layer 1, and this magnetization gives a transverse bias magnetic field to the MR layer 1. In the MR layer 1 which is put in an x-direction single domain state by a magnetically anisotropic magnetic field from the hard bias layer 7, the magnetization direction (Bθ) is pointed at an angle of θ (for example, 45°) relative to the x direction by the transverse magnetic field applied from the SAL 3.

Therefore, although the magnetic permeability µ of the MR layer 1 is high in the direction of a leakage flux from a recording medium (y direction), the magnetic permeability µ of the SAL 3 in the y direction is decreased and the MR effect function thereof is restricted. Accordingly, the SAL 3 can serve a sufficient biasing function even if it is made of the same magnetic material as that of the MR layer 1.

The MR layer 1 and the SAL 3 are made of the same material, and therefore, have the same specific resistance ρ.

Therefore, the MR layer 1 and the SAL 3 are required to be different in volume to apply a sufficient stationary current to the MR layer 1. Since it is general in the magnetic head that the MR layer 1 and the SAL 3 have the same dimensions in the x and y directions, it is necessary to make a difference in thickness between the MR layer 1 and the SAL 3 to make the volumes thereof different. The difference in thickness makes a difference in the diversion ratio of the stationary currents to be applied to the MR layer 1 and the SAL 3, by which a sufficient stationary current can be applied to he MR layer 1. In the embodiment shown in FIG. 1, the thickness t1 of the MR layer 1 is 300 Å, the thickness t3 of the SAL 3 is 165 Å, and the ratio of the thickness t3 of the SAL 3 to the thickness t1 of the MR layer 1 (t3/t1) is set at 0.55.

The hard bias type magnetoresistive magnetic head shown in FIG. 5 was produced by using the above-mentioned trilayer device consisting of the MR layer 1 of a $Ni_{81}Fe_{19}$ magnetic film having a thickness t1 of 300 Å, the SAL 3 similarly made of a $Ni_{81}Fe_{19}$ magnetic film having a thickness t3 of 165 Å and the SHUNT layer 2 of a Ta film having a thickness t2 of 150 Å. The change curve of the magnetic field (M) and the detection voltage (V) at this time is shown in FIG. 2. This M-V change curve is proportional to the M(magnetic field)-R(electric resistance) change curve. The dimension of the trilayer device in the x direction, that is, Tw is 3.5 µm and the depth thereof in the y direction is 2.0 µm.

Figure 2A:
FIGS. 2(A), 2(B) and 2(C) are charts showing the relationship between an external magnetic field to be applied to the magnetoresistive magnetic head of the present invention and detection output, in which different stationary currents are applied.
Figure 2B:
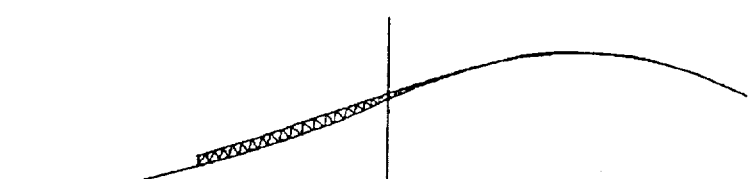
Figure 2C:
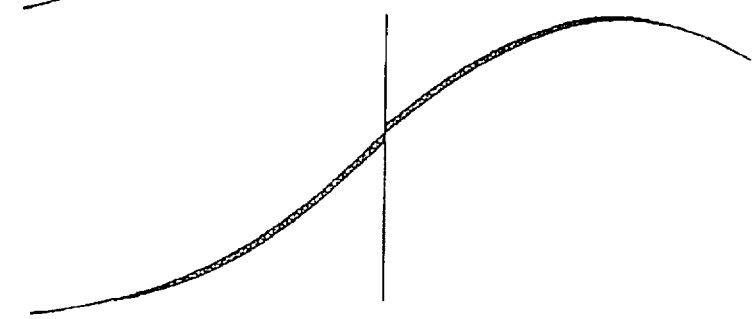
Figure 2C:
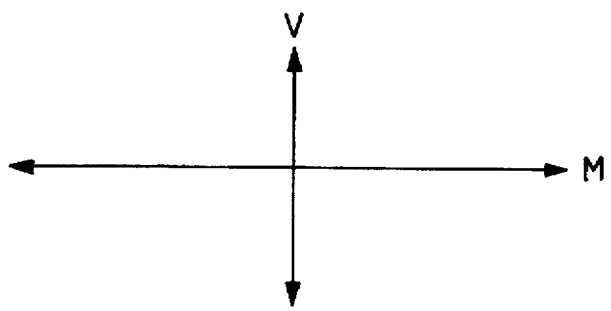

FIGS. 2(A) to 2(C) show measured values when external magnetic fields varying in a range of ±100 Oe are applied to the trilayer device in the y direction. The stationary currents applied to the trilayer device in the x direction in the cases shown in FIGS. 2(A), 2(B) and 2(C) are respectively 5 mA, 10 mA and 15 mA. FIG. 2 reveals that a sufficient magnetoresistive effect, that is, detection output can be obtained and little Barkhausen noise arises when the MR layer 1 and the SAL 3 are made of the same $Ni_{81}Fe_{19}$ magnetic film, the thickness ratio (t3/t1) is 0.55, a stationary current of approximately 10 mA or 15 mA is applied and the strength of the leakage magnetic field from the recording medium is approximately ±100 Oe.

Figure 3:
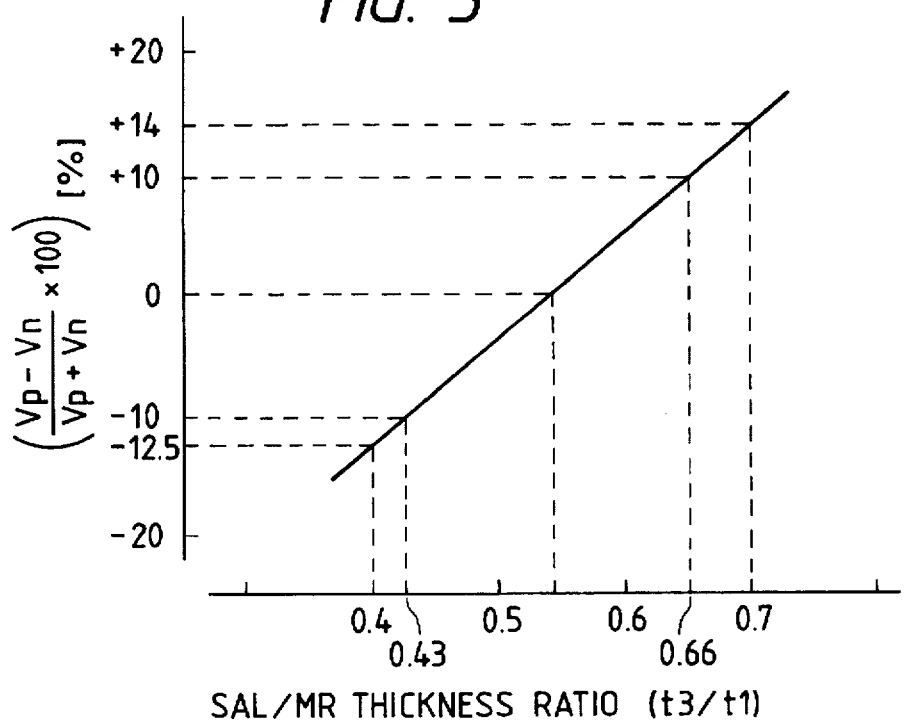
FIG. 3 is a graph showing the relationship between the thickness ratio between a MR layer and a SAL and the rate of change in reproduction output.

FIG. 3 Shows the relationship between the thickness ratio (t3/t1) between the MR layer 1 and the SAL 3 and the change rate in voltage between the positive side and the negative side of the detection output when the MR layer 1 and the SAL 3 are made of the same $Ni_{81}Fe_{19}$ magnetic film. This is the measurement result when the trilayer device shown in FIG. 1 has a dimension in the x direction (Tw:track width) of 3.5 µm and a depth D in the y direction of 2.0 µm and is used as a component of the hard bias type magnetic head shown in FIG. 5. The change rate of the detection output can be found from the following Formula 1

$$\frac{Vp - Vn}{Vp + Vn} \times 100$$

wherein Vp represents the peak value on the positive side of the detection voltage and Vn represents the peak value on the negative side when a stationary current of 10 mA is applied and leakage magnetic fields varying in a range of ±100 Oe are applied in the y direction.

It is known from FIG. 3 that there is little difference between the voltage from a point 0 to the peak value (Vp) on the positive side of the detection output and the voltage from the point 0 to the peak value (Vn) on the negative side and the M-R change has an excellent linearity when the ratio of the thickness t3 of the SAL 3 to the thickness t1 of the MR layer 1 (t3/t1) is about 0.55. Furthermore, when the thickness ratio (t3/t1) is in a range of 0.4 to 0.7, the change rate is in a range of −12.5% to +14%. This range is sufficiently practical. In order to set the change rate below ±10%, the thickness ratio (t3/t1) is required to be in a range of 0.43 to 0.66.

Therefore, a preferable ratio of the thickness t3 of the SAL 3 to the thickness t1 of the MR layer 1 (t3/t1) is in a range of 0.4 to 0.7, more preferably, a range of 0.43 to 0.66.

Figure 4:
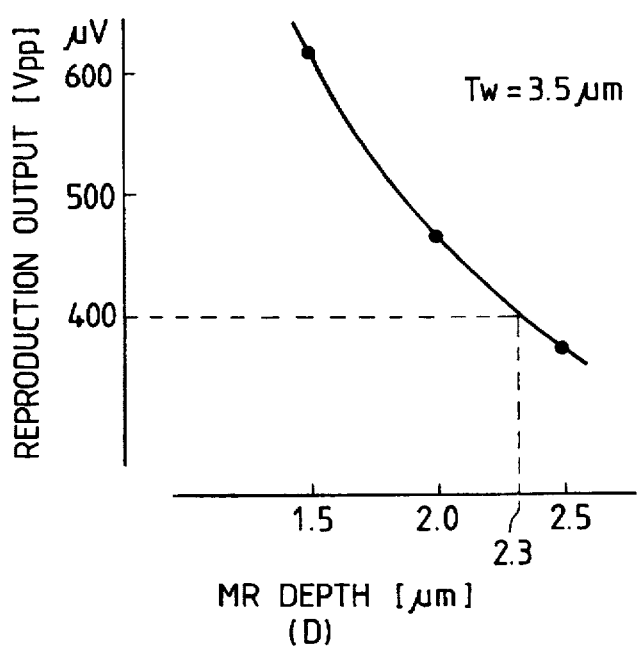
FIG. 4 is a graph showing the relationship between the depth of the trilayer device and the reproduction output.

FIG. 4 shows the relationship between the depth D of the trilayer device in the y direction shown in FIG. 1, and the peak-to-peak value Vpp of reproduction output (in microvolts μV). This is the measurement result when the hard bias type magnetic head shown in FIG. 5 is constituted by using a device in which the MR layer 1 and the SAL 3 are made of a $Ni_{81}Fe_{19}$ magnetic film, the SHUNT layer 2 is made of a Ta film, t1 is 300 Å, t2 is 150 Å, t3 is 165 Å and Tw is 3.5 μm.

As the depth D in the y direction of the device shown in FIG. 1 increases, the reproduction output decreases. It seems that this is because the electric resistance of the SAL 3 decreases as the volume thereof increases, the stationary current is liable to be diverted to the SAL 3 and therefore the reproduction output decreases. The reproduction output Vpp is required to be more than 400 μV, and a preferable y-direction depth D of the trilayer device is less than 2.3 μm.

Figure 6:
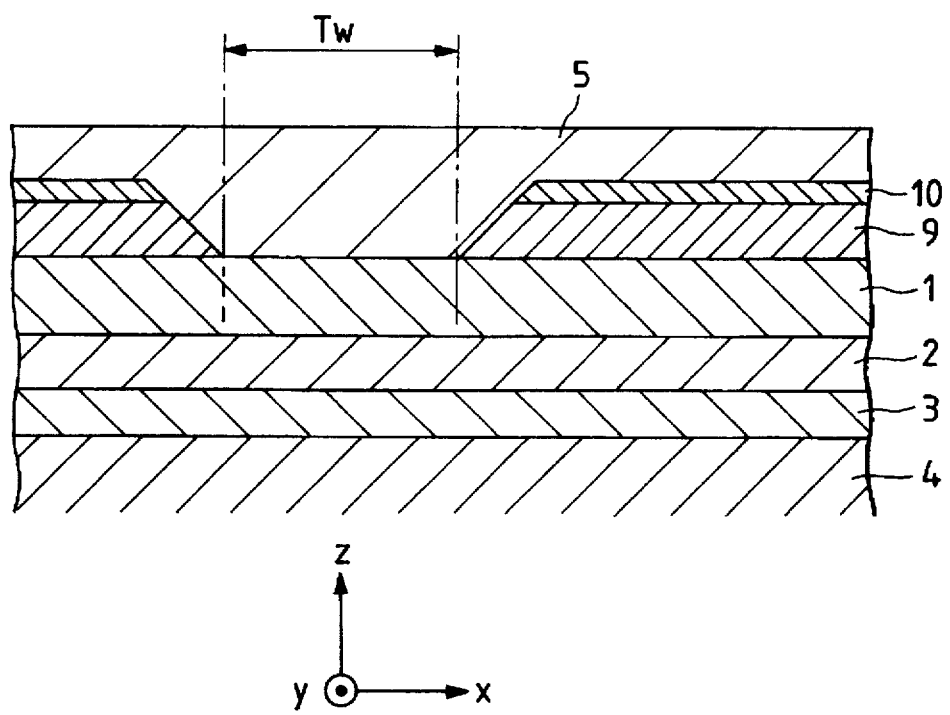
FIG. 6 is an enlarged front view of an exchange bias magnetoresistive magnetic head.

Although the hard bias magnetic head shown in FIG. 5 is constituted by using the trilayer device shown in FIG. 1 in the above-described embodiment, the MR layer 1 and the SAL 3 may also be made of the same magnetic material in the exchange bias magnetic head shown in FIG. 6. In this case, a high-precision detection output without any Barkhausen noise can be obtained by setting an appropriate volume ratio between the MR layer and the SAL, that is, an appropriate thickness ratio therebetween.

As described above, according to the present invention, since the MR layer and the SAL are made of the same magnetic material, they can be formed by using the same target in producing a magnetic head by sputtering, and production is simplified. A sufficient current applied to the MR layer can be secured and a sufficient MR effect can be shown by making the MR layer thicker than the SAL and setting the thickness ratio in an appropriate range.

What is claimed is:

1. A magnetoresistive magnetic head comprising:

a magnetoresistive (MR) layer;

a soft adjacent layer (SAL); and a non-magnetic SHUNT layer formed between said MR layer and said SAL;

wherein both of said MR layer and said SAL consist essentially of a common Ni—Fe magnetic material composition, whereby said MR layer and said SAL have a common specific resistance, wherein a ratio of a thickness of said SAL to a thickness of said MR layer is in the range of 0.4 to 0.7, and wherein a depth of said MR layer, said SHUNT layer, and said SAL is less than 2.3 μm.

2. A magnetoresistive magnetic head according to claim 1, wherein the ratio of the thickness of said SAL to the thickness of said MR layer is in the range of 0.43 to 0.66.

3. A magnetoresistive magnetic head according to claim 2, wherein the ratio of the thickness of said SAL to the thickness of said MR layer is 0.55.

4. A magnetoresistive magnetic head according to claim 1, wherein said common NiFe magnetic material composition comprises 81% atomic weight of Ni and 19% atomic weight of Fe.

5. A magnetoresistive magnetic head according to claim 1, further comprising means for applying a stationary current ranging from 10 to 15 mA to said MR layer, said SHUNT layer, and said SAL, collectively.

* * * * *